United States Patent [19]

Senet

[11] 4,005,121
[45] Jan. 25, 1977

[54] PROCESS FOR THE PREPARATION OF OLIGOCARBONATES WITH TWO CATALYSTS

[75] Inventor: Jean-Pierre G. Senet, Vaux le Penil, France

[73] Assignee: Societe Nationale des Poudres et Explosifs, France

[22] Filed: Dec. 4, 1975

[21] Appl. No.: 637,758

[30] Foreign Application Priority Data

Dec. 11, 1974 France .............................. 74.40839

[52] U.S. Cl. .......................... 260/463; 260/47 XA
[51] Int. Cl.² ......................................... C07C 68/06
[58] Field of Search ...................... 260/463, 47 XA

[56] References Cited

UNITED STATES PATENTS 2,915,529  12/1959   Bell ................................... 260/463
3,549,682  12/1970   Vernaleken et al. ............. 260/463

Primary Examiner—Lewis Gotts
Assistant Examiner—D. R. Phillips
Attorney, Agent, or Firm—Bucknam and Archer

[57] ABSTRACT

A process for the preparation of linear aliphatic polycarbonates having terminal hydroxyl groups is carried out in two stages:

i. in the first stage, the transesterification is carried out in the presence of a basic catalyst at a temperature below 140° C, and ii. in the second stage, after complete destruction of the basic catalyst, the transesterification is completed in the presence of an acid catalyst at a temperature of between 200° and 250° C.

The polycarbonate-diols obtained are useful for the preparation of polyurethane elastomers which are resistant to hydrolysis.

9 Claims, No Drawings

PROCESS FOR THE PREPARATION OF OLIGOCARBONATES WITH TWO CATALYSTS

The present invention relates to a process for the preparation of linear aliphatic polycarbonates which have terminal hydroxyl groups and a number average molecular weight of from 500 to 3,000, and the number of functional groups (i.e. the number of terminal hydroxyl groups per molecule) of which is greater than 1.95.

These oligomers, which will hereinafter be referred to by the term "aliphatic polycarbonate-diols", have the following formula:

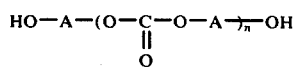

in which A is a linear aliphatic or cycloaliphatic difunctional radical having more than 4 carbon atoms.

The preparation of aliphatic polycarbonates by transesterification between a diol and a dialkyl carbonate is described in the work of CAROTHERS, VAN NATTA and HILL (*J. Am. Chem. Soc.*, 52, 314, 1930 and 55, 5031, (1933)):

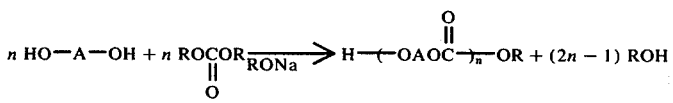

The reaction is carried out at an elevated temperature (120° to 220° C) and in the presence of strongly basic catalysts, such as alkali metal alcoholates. This type of reaction is described, in particular, in U.S. Pat. No. 2,787,632.

As H. SCHNELL indicates in "Chemistry and Physics of polycarbonates" (Wiley & Sons, 1964, page 15), it is impossible to obtain polymers of high molecular weight by means of this process, since the presence of basic catalysts leads, at the temperature employed, to degradation of the polycarbonate. Likewise, this process does not enable aliphatic polycarbonate-diols having a sufficient number of functional groups, that is greater than 1.95, to be obtained.

If, in preparing aliphatic polycarbonate-diols, an attempt is made to avoid degradation reactions by carrying out the transesterification at a lower temperature (below 150° C), the removal of the alcohol formed is incomplete and the product obtained contains a significant proportion of non-reactive

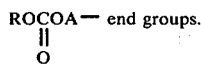

end groups.

U.S. Pat. No. 2,210,817 describes a process for the preparation of aliphatic polycarbonates of high molecular weights, which process comprises destroying the basic catalyst (when the majority of the alcohol has been removed by heating at 200° C under reduced pressure) and then terminating the reaction under a high vacuum in the presence of traces of a carboxylic acid ester. This process cannot be applied directly to the synthesis of aliphatic polycarbonate diols by transesterification between a diol and diethyl carbonate, mainly for the following reasons:

i. The reaction mixture always has a high content of hydroxyl groups, even at the end of transesterification. Since these groups catalyse degradation reactions in the presence of bases, the temperature must not exceed 140° C (instead of 200° C). It is thus difficult, if not impossible, to achieve a degree of forward reaction of higher than 99%, and ii. the second stage is difficult to carry out because of the problem of regulating the molecular weight of the product.

We have now developed an improved process for the preparation of aliphatic polycarbonate-diols.

According to the present invention, there is provided a process for the preparation of aliphatic polycarbonate-diols by transesterification between a diol and diethyl carbonate, which comprises two stages:

in the first stage, transesterification is carried out in the presence of a basic catalyst at a temperature below 140° C, and in the second stage, after complete destruction of the basic catalyst, the transesterification is completed in the presence of an acid catalyst at a temperature of from 200° to 250° C.

The basic catalyst used in the first stage is preferably formed by adding sodium, preferably from 0.1 to 0.5 g of sodium per mol of diol, to the reaction mixture. In carrying out the first stage, the temperature is preferably raised gradually from 90° to 130° C but is not allowed to exceed 140° C. A distillation column enables the diethyl carbonate being prevented from being entrained with the ethanol formed. Distillation is stopped when 70 to 80% of the theoretical amount of ethanol has been collected. At this point, the basic catalyst is destroyed. This may be done by introducing an inorganic acid (for example, hydrochloric acid) or an organic acid dichloride, in just sufficient amount, into the reaction mixture. Alternatively, and preferably, the products of the first stage are dissolved in a water-immiscible solvent and the solution is washed successively with a dilute aqueous solution of an inorganic acid (for example, hydrochloric acid) and then with pure water.

The acid catalyst used in the second stage is preferably a very small amount (less than $3 \times 10^{-3}$ mol per mol of diol) of a monocarboxylic or dicarboxylic acid, the boiling point of which is higher than 250° C under normal pressure. The temperature is raised to from 200° to 250° C until the remaining ethanol has distilled.

The number average molecular weight, $\overline{M}n$, of the product is readily controlled by adjustment of the molar ratio $$\frac{\text{diol}}{\text{diethyl carbonate}} = R$$

For example, in the case of transesterification between hexane-1,6-diol and diethyl carbonate:

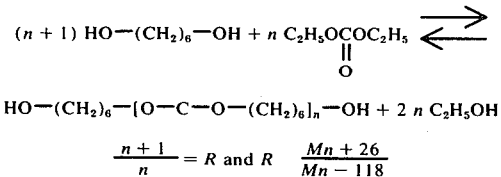

$$HO-(CH_2)_6-[O-C-O-(CH_2)_6]_n-OH + 2\,n\,C_2H_5OH$$
$$\phantom{HO-(CH_2)_6-[O-}\underset{O}{\|}$$

$$\frac{n+1}{n} = R \text{ and } R \quad \frac{Mn+26}{Mn-118}$$

Aliphatic polycarbonate-diols which are strictly difunctional (i.e. have 2 OH groups per molecule) are of great value for the preparation of polyurethane elastomers which are resistant to hydrolysis.

In order that the invention may be more fully understood, the following examples are given by way of illustration only; Example 1 is an example of the process according to the invention, Example 2 is an example of a prior art process given for the purpose of comparison, and Example 3 describes the preparation of polyurethanes from the products of Examples 1 and 2.

EXAMPLE 1

The apparatus used consisted of:

a 1 litre glass reactor equipped with an efficient stirrer, a thermometer and a distillation column, and a double jacket distillation column packed with Fenske coils (useful length 300 mm, diameter : 25 mm), and equipped with a manually controlled reflux head.

3 mols (358.1 g) of crude hexane-1,6-diol and 60 g of anhydrous benzene were introduced into the reactor which was provided with a short distillation column, in order to remove the water present in the hexanediol by azeotropic distillation. When all the benzene had been distilled off, the temperature of the reaction medium was reduced to 70° – 80° C and 0.6 g of carefully degreased sodium was added, with stirring.

After the sodium had reacted completely, 2.787 mols (332.5 g) of diethyl carbonate were introduced.

The reactor was equipped with the distillation column first referred to above and the mixture was heated whilst stirring vigorously.

When the temperature of the mass reached 95° – 100° C, the ethanol began to distil. Refluxing was regulated so that the temperature at the top of the column was equal to 78.5 ± 0.5° C. The temperature of the reaction medium was raised gradually to 130° C. Distillation was stopped when 72.2% (185.4 g) of the theoretical amount of ethanol had been collected. On average, this distillation lasts for 1 hour.

The reaction mixture was decanted into a 2 litre container and was cooled to 70° C; 300 ml of aqueous N hydrochloric acid were added to it. The mixture was stirred vigorously and 250 ml of dichloromethane were added. The organic phase was decanted, washed once with 500 ml of water and dried over anhydrous sodium sulphate.

The organic solution obtained was reintroduced into the reactor and was heated so as to remove the dichloromethane and the residual water (boiling point of the azeotropic mixture $CH_2Cl_2$—$H_2O$ : 38° C).

2 g of stearic acid were added and the reaction medium was heated to 235° – 240° C. After a short period of time, the ethanol distilled over the course of approximately one-fourth hour (amount collected: 62 g). The temperature was reduced to 200° C and the pressure was reduced to 20 mm Hg, and these parameters were kept constant for one-half hour.

The reaction mixture was then cooled to 30° C, dissolved in 300 ml of dichloromethane and washed once with 500 ml of water.

After removing the solvent by evaporation under reduced pressure, the product was stirred vigorously at 140° C under 2 – 3 mm Hg for one-half hour.

The aliphatic polycarbonate-diol obtained was in the form of an odourless white wax which was soluble in the cold in the following solvents: toluene, dichloromethane, acetone and ethyl acetate.

| | |
|---|---|
| hydroxyl content: (acetylation method) | (1.02 ± 0.02) equivalent/kg |
| residual acidity: | 6.4 × 10⁻³ equivalent/kg |
| water content: | 0.05% | measurement of the intrinsic viscosity ($\nu$).

This measurement was carried out with an automatic dilution FICA "Viscomatic" viscometer using a level suspended UBBELOHDE tube (nominal diameter of the capillary : 0.5 mm).

The value of ($\nu$) was determined, following the HUGGINS procedure, by extrapolating the following curve to zero concentration $$\frac{\eta_{sp}}{C} = f(C) \quad \text{or} \quad \frac{T-T_o}{T_oC} = f^*(C)$$

$\nu_{sp}$: specific viscosity
$c$: concentration of the polymer
$T$ and $T_o$: fall time of the solution at concentration C and of the pure solvent
($\nu$) = 0.124 dlg⁻¹ solvent : dichloromethane
temperature : (30 ± 0.03)° C measurement of the number average molecular weight $\overline{Mn}$.

$\overline{Mn}$ was determined by thermoelectric tonometry in a HEWLETT-PACKARD "MECHROLAB" vapour pressure apparatus. Calibration was carried out using a sample of polystyrene having a molecular weight of 2,000 (G.P.C. WATERS standard). The measurements, carried out at 37° C (solvent : toluene dried over a molecular sieve) gave the following result:

$\overline{Mn}$ (corrected) = 1,980 ± 30

The number average number of functional groups, $\overline{f}$, was deducted from the hydroxyl content and from the value of $\overline{Mn}$:

$1.95 < \overline{f} < 2.09$

EXAMPLE 2

The apparatus and starting materials used were as described for Example 1.

3 mols (358.1 g) of crude hexane-1,6-diol were introduced into the reactor provided with the short distillation column. The water was removed and the catalyst was prepared (introduction of 0.6 g of sodium) as in Example 1.

After the sodium had reacted completely, 2.787 mols (332.5 g) of diethyl carbonate were introduced. The reactor was provided with the distillation column first referred to above and the mixture was heated, with vigorous stirring.

When the temperature in the mass reached 95° – 100° C, the ethanol began to distil. The reflux was regulated so that the temperature at the top of the column was equal to 78.5° ± 0.5° C. The temperature of the reaction medium was raised gradually to 145° C over the course of 1 hour. 198 g of ethanol, corresponding to 77.2% of the theoretical amount, were then collected.

36.0 g of diethyl carbonate were added and the reaction medium was kept at 145° C. Ethanol ceased to distil after 30 minutes. The pressure was reduced gradually to 15 mm Hg over the course of 30 minutes so as to remove the last traces of ethanol.

The reaction mixture was decanted into a 2 litre container and cooled to 70° C; 300 ml of aqueous N hydrochloric acid were added to it. The mixture was stirred vigorously and 250 ml of dichloromethane were added. The organic phase was decanted and washed with water until the wash waters were neutral.

After removing the solvent and the water by evaporation under reduced pressure, the product was stirred vigorously at 140° C under 2 – 3 mm Hg for 30 minutes.

The physico-chemical properties of the aliphatic polycarbonate-diol obtained were measured in the same way as before:

| | |
|---|---|
| Hydroxyl content: | (1.08 ± 0.2) equivalent/kg |
| residual acidity: | $16 \times 10^{-3}$ equivalent/kg |
| water content: | 0.06% |
| $(\eta)$: | 0.128 dl.g$^{-1}$ |
| Mn (corrected): | 1,760 ± 30 |
| $1.83 < f < 1.97$ | |

The number average number of functional groups, $\bar{f}$, was thus less than that of the polycarbonate obtained by the process of Example 1.

EXAMPLE 3

0.1 Mol of the aliphatic polycarbonate-diol of Example 1 and 0.2 mol of di-(4-isocyanato-phenyl)methane were mixed and the mixture was heated for 3 hours at 80° C, with stirring. The prepolymer obtained was kneaded with 0.1 mol of butane-1,4-diol for 5 hours at 110° C.

The tensile strength of a film prepared by compression moulding of the elastomer obtained was between 300 and 400 kgf/cm$^2$.

By way of comparison, the above procedure was followed using the polycarbonate-diol obtained in Example 2. The elastomer obtained had a tensile strength of 150 to 200 kgf/cm$^2$.

This example shows that the pure aliphatic polycarbonate-diols obtainable by the process according to the invention are capable of giving rise to high performance elastomers.

I claim:

1. A process for the preparation of aliphatic polycarbonate-diols by transesterification between a diol and diethyl carbonate, which comprises the following two stages:
   I. transesterification carried out in the presence of a basic catalyst at a temperature below about 140° C, and
   II. after complete destruction of the basic catalyst, the transesterification is completed in the presence of an acid catalyst at a temperature of from about 200° to about 250° C.

2. The process set forth in claim 1, wherein said basic catalyst is formed by adding sodium to the reaction mixture.

3. The process set forth in claim 2, wherein the amount of sodium used is from 0.1 to 0.5 g per mol of diol.

4. The process set forth in claim 1, wherein said basic catalyst is destroyed by adding an inorganic acid or an organic acid dichloride to the reaction mixture.

5. The process set forth in claim 4, wherein said inorganic acid is hydrochloric acid.

6. The process set forth in claim 1, wherein said basic catalyst is destroyed by dissolving the products obtained in the first stage in a water-immiscible solvent and washing the solution successively with an aqueous solution of an inorganic acid and then with pure water.

7. The process set forth in claim 6, wherein said inorganic acid is hydrochloric acid.

8. The process set forth in claim 1, wherein said acid catalyst is a monocarboxylic or dicarboxylic acid, the boiling point of which is higher than about 250° C under normal pressure.

9. The process set forth in claim 8, wherein the amount of acid catalyst used is less than $3 \times 10^{-3}$ mol per mol of diol.

* * * * *